United States Patent
Dong et al.

(10) Patent No.: US 11,660,745 B2
(45) Date of Patent: May 30, 2023

(54) INDUSTRIAL ROBOT MOTION ACCURACY COMPENSATION METHOD AND SYSTEM, AND COMPUTER DEVICE

(71) Applicant: China Electronics Reliability And Environmental Testing Institute ((The Fifth Institute of Electronics, Ministry of Industry and Information Technology) (China Saibao Laboratory)), Guangzhou (CN)

(72) Inventors: Chengju Dong, Guangzhou (CN); Wenwei Liu, Guangzhou (CN); Chunhui Wang, Guangzhou (CN); Yuanhang Wang, Guangzhou (CN); Boehen Chen, Guangzhou (CN); Guangkuo Guo, Guangzhou (CN); Yisheng Fan, Guangzhou (CN); Jialing Lin, Guangzhou (CN); Xiaobing Li, Guangzhou (CN); Jianfeng Yang, Guangzhou (CN)

(73) Assignee: China Electronics Reliability And Environmental Testing Institute ((The Fifth Institute of Electronics, Ministry of Industry and Information Technology) (China Saibao Laboratory))

( * ) Notice: Subject to any disclaimer, the term of this patent is extended or adjusted under 35 U.S.C. 154(b) by 0 days.

(21) Appl. No.: 17/965,079

(22) Filed: Oct. 13, 2022

(65) Prior Publication Data
US 2023/0136402 A1 May 4, 2023

(51) Int. Cl.
*B25J 9/16* (2006.01)

(52) U.S. Cl.
CPC .............. *B25J 9/163* (2013.01); *B25J 9/161* (2013.01); *B25J 9/1605* (2013.01); *B25J 9/1653* (2013.01); *B25J 9/1664* (2013.01)

(58) Field of Classification Search
CPC . B25J 9/163; B25J 9/1605; B25J 9/161; B25J 9/1653; B25J 9/1664; B25J 13/085;
(Continued)

(56) References Cited

U.S. PATENT DOCUMENTS

| 10,994,422 | B2* | 5/2021 | Suzuki | B25J 13/06 |
| 2016/0327934 | A1* | 11/2016 | Morimoto | B25J 9/1653 |
| 2022/0072701 | A1 | 3/2022 | Zhang | |

FOREIGN PATENT DOCUMENTS

| CN | 109015648 A | 12/2018 |
| CN | 109551485 A | 4/2019 |

(Continued)

OTHER PUBLICATIONS

Notification to Grant Patent Right for Invention including Search Report for Chinese Application No. 202111211520.3 dated Dec. 6, 2021, 2 pages.

(Continued)

*Primary Examiner* — Abby Y Lin
*Assistant Examiner* — Esvinder Singh
(74) *Attorney, Agent, or Firm* — Lerner David LLP (57) ABSTRACT

An industrial robot motion accuracy compensation method includes: establishing a motion parameter database, wherein the motion parameter database includes a plurality of different reference operating conditions and a motion parameter of the industrial robot corresponding to each reference operating condition, and each reference operating condition is formed by combining each element in each set in a total set of operation conditions; acquiring a current operating condition of the industrial robot; determining whether there (Continued)

is a reference operating condition matched with the current operating condition in the motion parameter database; if yes, taking a motion parameter corresponding to the matched reference operating condition as a motion parameter corresponding to the current operating condition; if no, performing an interpolation on a motion parameter corresponding to the current operating condition, and taking an interpolation result as the motion parameter corresponding to the current operating condition.

9 Claims, 4 Drawing Sheets

(58) Field of Classification Search
CPC ...... B25J 9/1633; B25J 9/1651; B25J 9/1656; B25J 9/1692; B25J 13/089; B25J 9/1615; A61B 2018/00648; A61B 2018/00696; G05B 2219/23064; G05B 2219/23101; G05B 2219/23399; G05B 2219/25098; G05B 2219/25101; G05B 2219/32053; G05B 2219/32139; G05B 2219/39247; G05B 2219/33116; H01L 21/67778
See application file for complete search history.

(56) References Cited

FOREIGN PATENT DOCUMENTS

| CN | 109591051 A | 4/2019 |
|----|-------------|--------|
| CN | 109664297 A | 4/2019 |
| CN | 110421566 A | 11/2019 |
| CN | 110480609 A | 11/2019 |
| CN | 111590569 A | 8/2020 |
| CN | 111590581 A | 8/2020 |
| CN | 111844030 A | 10/2020 |
| DE | 102008060052 A1 | 6/2010 |

OTHER PUBLICATIONS

Search Report dated Nov. 15, 2021 from the Office Action for Chinese Application No. 202111211520.3 dated Nov. 23, 2021, 3 pages.

* cited by examiner

INDUSTRIAL ROBOT MOTION ACCURACY COMPENSATION METHOD AND SYSTEM, AND COMPUTER DEVICE

CROSS REFERENCE TO RELATED APPLICATION

The present disclosure is based on and claims priority to Chinese Patent Application with No. 202111211520.3 and filed on Oct. 18, 2021, the content of which is expressly incorporated herein by reference in its entirety.

TECHNICAL FIELD

The present disclosure relates to the field of robot calibration technique, and particularly to an industrial robot motion accuracy compensation method and system, a computer device and a storage medium.

BACKGROUND

As one of the important carriers for the transformation and upgrading of the intelligent manufacturing, industrial robots are more and more widely used in the fields of aerospace, flexible manufacturing and precision machining, etc., due to the flexibility and other characteristics thereof. The motion accuracy is an important parameter of the industrial robot, and even determines the application range of the industrial robot. After the industrial robot leaves the factory, the body structure size cannot be changed, and the error of the structure size affects the motion accuracy. The motion accuracy of the industrial robot can only be improved by calibrating and compensating the motion parameter of the industrial robot.

In related technologies, the motion accuracy of the industrial robot is generally obtained by testing via a device such as a laser tracker and line displacement sensor, or via a method such as machine vision, periodically or afterwards; the calibration and compensation of the motion parameter of the industrial robot are performed when the motion accuracy of the industrial robot is decreased and dissatisfies the requirements, thereby improving the motion accuracy of the industrial robot. When calibrating and compensating the motion parameter of the industrial robot, the whole operating area of the industrial robot is analyzed, and finally a comprehensive motion parameter is obtained as the motion parameter during the operation of the industrial robot.

However, there exists three problems in this process. Firstly, the testing and calibration of the motion accuracy of the robot is performed periodically or afterwards, and each testing takes a long time, which affects the operating efficiency of the industrial robot, resulting in low operating efficiency of the industrial robot. Secondly, in the fields of aerospace, flexible manufacturing and other fields, the industrial robot does not only work under a single operating condition such as a single load and a single operating area, but operating conditions are constantly changed, and the changes in operating conditions may change the motion parameter of the industrial robot, which directly affects the motion accuracy of the industrial robot. For example, after the weight of the load of the industrial robot changes, the flexibility of the connecting rod of the industrial robot is changed, which leads to a change in the motion parameter of the industrial robot, and directly affects the motion accuracy. Thirdly, when the industrial robot works in a specific operating area, if the entire operating area of the industrial robot is analyzed to obtain a comprehensive motion parameter to determine the motion parameter of the specific area, there exists a problem of low motion accuracy.

SUMMARY

In view of this, as for the above technical problem, it is necessary to provide an industrial robot motion accuracy compensation method and system, a computer device and a storage medium capable of improving the motion accuracy of the industrial robots.

An industrial robot motion accuracy compensation method is provided, which includes:

establishing a motion parameter database, wherein the motion parameter database includes a plurality of different reference operating conditions and a motion parameter of the industrial robot corresponding to each reference operating condition, and each reference operating condition is formed by combining each element in each set in a total set of operation conditions;

acquiring a current operating condition of the industrial robot;

determining whether there is a reference operating condition matched with the current operating condition in the motion parameter database;

when there is a reference operating condition matched with the current operating condition in the motion parameter database, taking a motion parameter corresponding to the matched reference operating condition as a motion parameter corresponding to the current operating condition;

when there is no reference operating condition matched with the current operating condition in the motion parameter database, performing an interpolation on a motion parameter corresponding to the current operating condition, and taking an interpolation result as the motion parameter corresponding to the current operating condition.

In an embodiment, the total set of operating conditions comprises a set of load values and a set of operating areas, and the establishing the motion parameter database includes:

combining each load value in the set of load values with each operating area in the set of operating areas, taking each combination result as a reference operating condition, determining a motion parameter corresponding to each reference operating condition, and forming the motion parameter database by each reference operating condition and the motion parameter corresponding to each reference operating condition.

In an embodiment, a determination of the set of load values includes:

adjusting a load of the industrial robot based on a preset mode, wherein an adjustment range of the load is a load range of the industrial robot; and forming the set of load values by a load after each adjustment.

In an embodiment, a determination of the set of operating areas includes:

determining a maximum operating space in front of the industrial robot;

establishing a cube-shaped area according to the maximum operating space in front of the industrial robot;

connecting midpoints of every two opposite sides of the cube-shaped area to divide the cube-shaped area into eight cube-shaped sub-areas, and summarizing the eight cube-shaped sub-areas as six operating areas, namely a front operating area, a rear operating area, a left operating area, a right operating area, an upper operating area, and a lower operating area;

forming the set of operating areas with the six operating areas, namely the front operating area, the rear operating area, the left operating area, the right operating area, the upper operating area, and the lower operating area.

In an embodiment, the current operating condition includes a current load and a current operating area; the performing the interpolation on the motion parameter corresponding to the current operating condition and taking the interpolation result as the motion parameter corresponding to the current operating condition includes:

averaging motion parameters corresponding to reference operating conditions that satisfy a preset condition, taking an average value as the motion parameter corresponding to the current operating condition, wherein the preset condition comprises: an operating area is the same as a current motion area, and a load is approximate to the current load.

In an embodiment, the total set of operating conditions includes a set of load values, a set of temperature values, and a set of operating areas; the establishing the motion parameter database includes:

combining each load value in the set of load values, each temperature value in the set of temperature values and each operating area in the set of operating areas, taking each combination result as a reference operating condition, determining the motion parameter corresponding to each reference operating condition, and forming the motion parameter database by each reference operating condition and the motion parameter corresponding to each reference operating condition.

An industrial robot motion accuracy compensation system is provided, which includes:

an establishment module configured to establish a motion parameter database, wherein the motion parameter database comprises a plurality of different reference operating conditions and a motion parameter of the industrial robot corresponding to each reference operating condition, and each reference operating condition is formed by combining each element in each set in a total set of the operation conditions;

an identification module configured to acquire a current operating condition of the industrial robot;

a processing module configured to: determine whether there is a reference operating condition matched with the current operating condition in the motion parameter database, wherein the motion parameter database comprises a plurality of different reference operating conditions and a motion parameter of the industrial robot corresponding to each reference operating condition; when there is a reference operating condition matched with the current operating condition in the motion parameter database, take a motion parameter corresponding to the matched reference operating condition as a motion parameter corresponding to the current operating condition; when there is no reference operating condition matched with the current operating condition in the motion parameter database, perform an interpolation on a motion parameter corresponding to the current operating condition, and take an interpolation result as a motion parameter corresponding to the current operating condition, and input the motion parameter corresponding to the current operating condition to a compensation output module;

the compensation output module configured to receive the motion parameter corresponding to the current operating condition, and input the motion parameter corresponding to the current operating condition to a robot controller.

In an embodiment, the identification module is configured to acquire the current operating condition of the industrial robot through a manual input mode or an automatic identification mode.

A computer device is provided, including a processor and a memory storing a computer program, the processor, when executing the computer program, implements the steps of:

establishing a motion parameter database, wherein the motion parameter database includes a plurality of different reference operating conditions and a motion parameter of the industrial robot corresponding to each reference operating condition, and each reference operating condition is formed by combining each element in each set in a total set of operation conditions;

acquiring a current operating condition of the industrial robot;

determining whether there is a reference operating condition matched with the current operating condition in the motion parameter database;

when there is a reference operating condition matched with the current operating condition in the motion parameter database, taking a motion parameter corresponding to the matched reference operating condition as a motion parameter corresponding to the current operating condition;

when there is no reference operating condition matched with the current operating condition in the motion parameter database, performing an interpolation on a motion parameter corresponding to the current operating condition, and taking an interpolation result as the motion parameter corresponding to the current operating condition.

A computer-readable storage medium is provided, on which a computer program is stored, when the computer program is executed by a processor, the following steps implemented:

establishing a motion parameter database, wherein the motion parameter database includes a plurality of different reference operating conditions and a motion parameter of the industrial robot corresponding to each reference operating condition, and each reference operating condition is formed by combining each element in each set in a total set of operation conditions;

acquiring a current operating condition of the industrial robot;

determining whether there is a reference operating condition matched with the current operating condition in the motion parameter database;

when there is a reference operating condition matched with the current operating condition in the motion parameter database, taking a motion parameter corresponding to the matched reference operating condition as a motion parameter corresponding to the current operating condition;

when there is no reference operating condition matched with the current operating condition in the motion parameter database, performing an interpolation on a motion parameter corresponding to the current operating condition, and taking an interpolation result as the motion parameter corresponding to the current operating condition.

Through the industrial robot motion accuracy compensation method and system, the computer device and the storage medium for the above-mentioned industrial robot motion accuracy, the motion parameter database is established, the current operating condition of the industrial robot is acquired, and whether there is a reference operating condition matched with the current operating condition in the motion parameter database is determined; if there is a reference operating condition matched with the current operating condition in the motion parameter database, the motion parameter corresponding to the matched reference operating condition serves as the motion parameter corresponding to the current operating condition; if there is no reference operating condition matched with the current operating condition in the motion parameter database, the interpolation is performed on the motion parameter corresponding to the current operating condition, the interpolation result serves as the motion parameter corresponding to the current operating condition. Before each operation of the industrial robot, the motion parameter corresponding to the current operating condition of the industrial robot is determined, thereby avoiding the problem that when the operating condition of the industrial robot is changed, the motion parameter of the industrial robot changes, which directly affects the motion accuracy of the industrial robot.

DETAILED DESCRIPTION

In order to make the purpose, technical solution and advantages of the present disclosure clearer, the present disclosure will be further detailed with reference to the accompanying drawings and embodiments. It should be appreciated that specific embodiments described here are merely used for explaining the present disclosure, rather than limiting the present disclosure.

As one of the important carriers for the transformation and upgrading of the intelligent manufacturing, industrial robots are more and more widely used in the fields of aerospace, flexible manufacturing and precision machining, etc., due to the flexibility and other characteristics thereof. The motion accuracy is an important parameter of the industrial robot, and even determines the application range of the industrial robot. After the industrial robot leaves the factory, the body structure size cannot be changed, and the error of the structure size affects the motion accuracy. The motion accuracy of the industrial robot can only be improved by calibrating and compensating the motion parameter of the industrial robot.

In related technologies, the motion accuracy of the industrial robot is generally obtained by testing via a device such as a laser tracker and line displacement sensor, or via a method such as machine vision, periodically or afterwards; the calibration and compensation of the motion parameter of the industrial robot are performed when the motion accuracy of the industrial robot is decreased and dissatisfies the requirements, thereby improving the motion accuracy of the industrial robot. When calibrating and compensating the motion parameter of the industrial robot, the whole operating area of the industrial robot is analyzed, and finally a comprehensive motion parameter is obtained as the motion parameter during the operation of the industrial robot.

However, there exists three problems in this process. Firstly, the testing and calibration of the motion accuracy of the robot is performed periodically or afterwards, and each testing takes a long time, which affects the operating efficiency of the industrial robot, resulting in low operating efficiency of the industrial robot. Secondly, in the fields of aerospace, flexible manufacturing and other fields, the industrial robot does not only work under a single operating condition such as a single load and a single operating area, but operating conditions are constantly changed, and the changes in operating conditions may change the motion parameter of the industrial robot, which directly affects the motion accuracy of the industrial robot. For example, after the weight of the load of the industrial robot changes, the flexibility of the connecting rod of the industrial robot is changed, which leads to a change in the motion parameter of the industrial robot, and directly affects the motion accuracy. Thirdly, when the industrial robot works in a specific operating area, if the entire operating area of the industrial robot is analyzed to obtain a comprehensive motion parameter to determine the motion parameter of the specific area, there exists a problem of low motion accuracy.

As for the problems in the above-mentioned related technology, in an embodiment of the present disclosure an industrial robot motion accuracy compensation method is provided, which can be applied to a server, and the server can be implemented by an independent server or a server cluster consisting of multiple servers. It should be noted that the quantity such as "multiple", etc., mentioned in the various embodiments of the present disclosure all refer to "at least two", for example, "multiple" refers to "at least two".

Before describing the specific embodiment of the present disclosure, a main application scenario of the embodiment of the present disclosure is described first. In an embodiment of the present disclosure, an industrial robot motion accuracy compensation method is provided, and the method is mainly applied to a scenario of calibrating and compensating a motion parameter of an industrial robot. Mainly by establishing a motion parameter database, in which the motion parameter database includes motion parameters of the industrial robot corresponding to various reference operating conditions. Before each operation of the industrial robot, the current operating condition of the industrial robot is acquired, and a motion parameter corresponding to the current operating condition is determined based on the motion parameter database. The motion parameter of the industrial robot corresponding to the current operating condition is determined before each operation of the industrial robot, thereby avoiding the problem that when the operating condition of the industrial robot is changed, the motion parameter of the industrial robot changes, which directly affects the motion accuracy of the industrial robot. In addition, before each operation of the industrial robot, the motion parameter corresponding to the current operating condition can be determined only by matching the current operating condition with the motion parameter database, without taking a lot of testing time, thereby improving the operating efficiency of the industrial robot. In addition, since the motion parameter is not calibrated based on the entire operating area of the industrial robot, and the minimum operating area of the industrial robot is determined before each operation, and then the current operating condition of the industrial robot is matched with the motion parameter database to determine the motion parameter corresponding to the current operating condition, the determined motion parameter is calibrated based on the minimum operating area of the industrial robot during the calibration, so that the determined motion parameter is more accurate, and the motion accuracy is higher when the industrial robot operates under the motion parameter.

Figure 1:
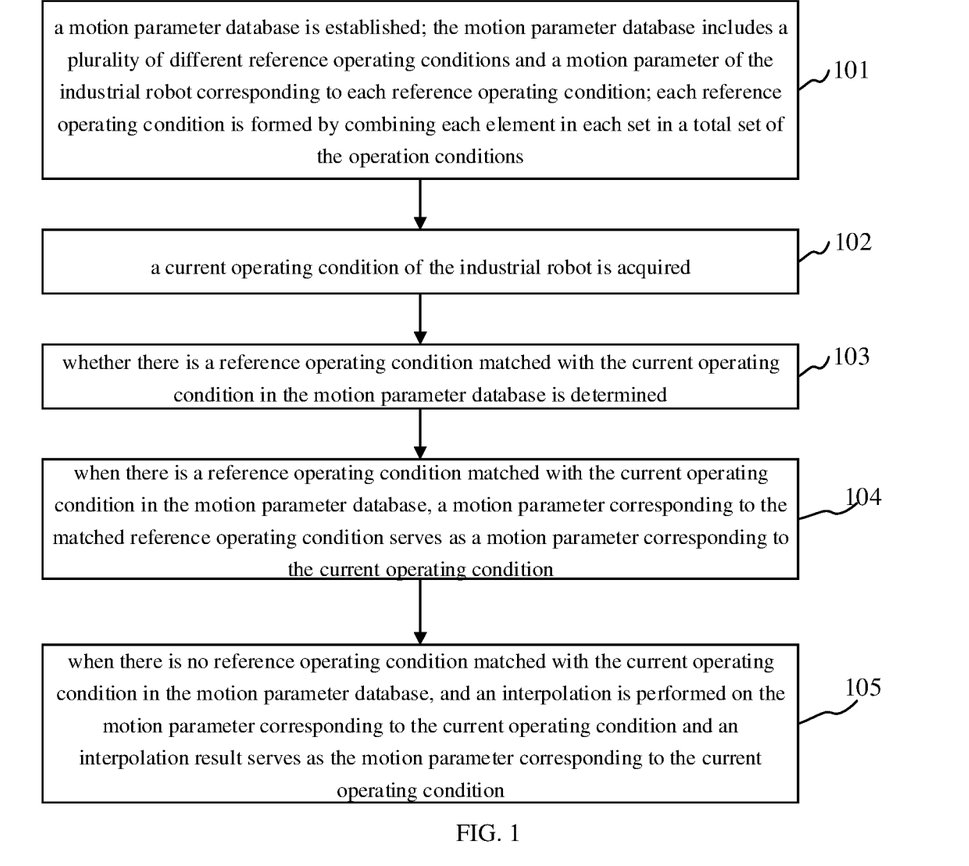
FIG. 1 is a flow chart showing an industrial robot motion accuracy compensation method according to an embodiment of the present disclosure.

In view of this, referring to FIG. 1, an industrial robot motion accuracy compensation method is provided. The method is applied to a server which serves as an executive subject to illustrate as an example, the method includes following steps.

101: a motion parameter database is established; the motion parameter database includes a plurality of different reference operating conditions and a motion parameter of the industrial robot corresponding to each reference operating condition; each reference operating condition is formed by combining each element in each set in a total set of the operation conditions.

102: a current operating condition of the industrial robot is acquired.

103: whether there is a reference operating condition matched with the current operating condition in the motion parameter database is determined.

104: when there is a reference operating condition matched with the current operating condition in the motion parameter database, a motion parameter corresponding to the matched reference operating condition serves as a motion parameter corresponding to the current operating condition.

105: when there is no reference operating condition matched with the current operating condition in the motion parameter database, and an interpolation is performed on the motion parameter corresponding to the current operating condition and an interpolation result serves as the motion parameter corresponding to the current operating condition.

In the above step 101, the total set of operating conditions may include a set of load values and a set of operating areas; or may include a set of load values, a set of temperature values, and a set of operating areas; or may include a set of load values, a set of temperature values, a set of humidity values, and a set of operating areas, which are not specifically limited by the embodiments of the present disclosure. Specifically, which types of operating conditions included in the total set of operating conditions are determined according to specific requirements of the industrial robot. For example, the load, temperature and operating area have a great influence on the motion parameter of the industrial robot. Accordingly, the total set of operating conditions includes a set of load values, a set of temperature values, and a set of operating areas.

In addition, for example, the current operating condition of the industrial robot include a load, a temperature, a humidity and an operating area. Accordingly, the step of establishing the motion parameter database may include: each load value in the set of load values, each temperature value in the set of temperature values, each humidity value in the set of humidity values, and each operating area in the set of operating areas are combined; and each combination result serves as a reference operating condition, and a motion parameter corresponding to each reference operating condition is determined; each reference operating condition and the motion parameter corresponding to each reference operating condition form the motion parameter database.

In the above step 102, the current operating condition of the industrial robot may include the load and the operating area. However, some industrial robots may operate under the operating conditions with large temperature changes, and the change in the temperature may also change the flexibility of the connecting rod of the industrial robot. Therefore, the current operating condition of the industrial robot may include the load, the temperature, and the operating area, which are not specifically limited by the embodiment of the present disclosure. Specifically, the current operating condition of the industrial robot is determined by an operating content and an operating environment of the industrial robot.

In the above step 103, a mode of the matching is exact matching. For example, the current operating condition of the industrial robot include the load and the operating area; and when the current load is 40 kg, the operating area is A. When there is a reference operating condition matched with the current operating condition of the industrial robot in the motion parameter database, the reference operating condition matched with the current operating condition correspondingly includes the load and the operating area; and the load is also 40 kg, and the operating area is also A. The exact matching mode is adopted, so that the determined motion parameter of the industrial robot corresponding to the current operating condition is more accurate, thereby effectively improving the motion accuracy of the industrial robot. In addition, the above process of determining whether there is a reference operating condition matched with the current operating condition in the motion parameter database is performed before the operation of the industrial robot.

In the above-mentioned step 105, a mode of the interpolation may be a linear interpolation, an exponential interpolation, a polynomial interpolation, a logarithmic interpolation, etc., which is not specifically limited by the embodiment of the present disclosure.

In the above steps 104 and 105, after the motion parameter of the industrial robot corresponding to the current operating condition is determined, the motion parameter corresponding to the current operating condition is transmitted to a robot controller in order to optimize a motion control system of the industrial robot and implement the calibration and compensation of the motion parameter of the industrial robot.

In the method provided by the embodiment of the present disclosure, the current operating condition of the industrial robot is acquired by establishing the motion parameter database; whether there is the reference operating condition matched with the current operating condition in the motion parameter database is determined; when there is the reference operating condition matched with the current operating condition in the motion parameter database, the motion parameter corresponding to the matched reference operating condition serves as the motion parameter corresponding to the current operating condition; when there is no reference operating condition matched with the current operating condition in the motion parameter database, the interpolation is performed on the motion parameter corresponding to the current operating condition, and the interpolation result serves as the motion parameter corresponding to the current operating condition. The motion parameter of the industrial robot corresponding to the current operating condition is determined before each operation of the industrial robot, thereby avoiding the problem that the motion parameter of the industrial robot changes when the operating condition of the industrial robot changes, which directly affects the motion accuracy of the industrial robot.

In addition, before each operation of the industrial robot, the motion parameter corresponding to the current operating condition can be determined only by matching the current operating condition with the motion parameter database, without requiring a lot of testing time, thereby improving the operating efficiency of the industrial robot.

In addition, because the motion parameter is not calibrated based on the entire operating area of the industrial robot, but the minimum operating area of the industrial robot is determined before each operation, and then the current operating condition of the industrial robot is matched to the motion parameter database; the determined motion parameter is calibrated based on the minimum operating area of the industrial robot, so that the determined motion parameter is more accurate, and the motion accuracy is higher when the industrial robot operates under the motion parameter.

Furthermore, if there is no reference operating condition matched with the current operating condition in the motion parameter database, the interpolation is performed on the motion parameter corresponding to the current operating condition, and the interpolation result serves as the motion parameter corresponding to the current operating condition. Since the motion parameter database exclude the motion parameters of the industrial robot corresponding to any operating conditions, thereby reducing the time and workload for establishing the motion parameter database.

With reference to the above embodiments, in an embodiment, the total set of operating conditions includes a set of load values and a set of operating areas. Accordingly, the step of establishing a motion parameter database includes: each load value in the set of load values is combined with each operating area in the set of operating areas, and each combination result serves as the reference operating condition, and a motion parameter corresponding to each reference operating condition is determined, and then each reference operating condition and the motion parameter corresponding to each reference operating condition form the motion parameter database.

A value range of the set of load values can be a load range of the industrial robot. Since the value range of the set of load values is limited, and the value range is determined according to the actual operating situations of the industrial robot, the establishment of motion is reduced. the time of the parameter library, accordingly the time taken for establishing the motion parameter database is reduced, and the probability that the motion parameter database includes a reference operating condition matched with the current operating condition is improved. For example, the load range of the industrial robot is 0 kg to 100 kg; and accordingly, each load value in the set of load values is in the load range of 0 kg to 100 kg. Specifically, for example, the load range of the industrial robot is 0 kg to 100 kg, and the set of load values can include: 0 kg, 10 kg, 20 kg, 30 kg, 40 kg, 50 kg, 60 kg, 70 kg, 80 kg, 90 kg, and 100 kg; or may include: 0 kg, 20 kg, 40 kg, 60 kg, 80 kg, and 100 kg, which is not specifically limited by the embodiment of the present disclosure. It should be noted that the specific values in the set of load values can be determined according to the actual requirements of the industrial robot. For example, if 53 kg and 65 kg are commonly used loads for the industrial robot, 53 kg and 65 kg can be added into the set of load values. It should be noted that, the more values in the set of load values, the higher the probability that the set of load values includes a reference operating condition matched with the current operating condition, accordingly. The division range of the set of operating areas can be determined based on the maximum operating space of the industrial robot. Specifically, the set of operating areas can be formed by dividing the maximum operating space of a mechanical arm of the industrial robot and according to the division result; and the specific division mode of the maximum operating space can be determined based on the actual requirements of the industrial robot, which is not limited by the embodiment of the present disclosure. The division range of the set of operating areas is determined based on the maximum operating space of the industrial robot, so that the probability that the motion parameter database includes a reference operating condition matched with the current operating condition is improved; and the specific division mode of the maximum operating space can be determined in combination with the actual use requirements of the industrial robot, thereby improving the probability that the motion parameter database includes the reference operating condition matched with the current operating condition, and improving the accuracy of the motion parameter of the industrial robot corresponding to the current operating condition. The division range of the set of operating areas can also be directly determined based on the actual use requirements of the industrial robot, which is not specifically limited by the embodiment of the present disclosure. For example, if the industrial robot often operates in a certain area, the division range of the set of operating areas may be determined based on the area where the robot often operates.

In the method provided by the embodiment of the present disclosure, the motion parameter database is determined in an exhaustive manner. Because after the current operating condition of the industrial robot is acquired, there is no need to calibrate and compensate the motion parameter of the industrial robot according to the current operating condition; and it is only necessary to determine the current operating condition of the industrial robot and determine whether the motion parameter database includes a reference operating condition matched with the current operating condition, thereby improving the operating efficiency of the industrial robot, and avoiding the need to spend a lot of testing time to calibrate and compensate the motion parameter of the industrial robot after the industrial robot is put into production and before the industrial robot stats to operate each time.

With reference to the content of the above embodiment, in an embodiment, the step of determining the set of load values includes:

a load of the industrial robot is adjusted based on a preset mode, in which an adjustment range of the load is the load range of the industrial robot;

the set of load values is formed by the load after each adjustment.

For example, the load range of the industrial robot is 0 kg to 100 kg, and the load of the industrial robot can be adjusted based on a manner of increasing the load by 10 kg each time. If an initial value of the load of the industrial robot is 0 kg, accordingly, the loads after each adjustment are: 10 kg, 20 kg, 30 kg, 40 kg, 50 kg, 60 kg, 70 kg, 80 kg, 90 kg and 100 kg. Specifically, the preset mode can be determined based on the actual use requirements of the industrial robot.

In the method provided by the embodiment of the present disclosure, the adjustment range of the load is limited to the load range of the industrial robot, the value range of the set of load values is limited, and the value range is determined according to the actual operating situations of the industrial robot, so that the time taken to establish the motion parameter database is reduced and the probability that the motion parameter database includes a reference operating condition matched with the current operating condition is improved.

With reference to the content of the above-mentioned embodiment, in an embodiment, the step of determining the set of operating areas includes:

a maximum operating space in front of the industrial robot is determined;

a cube-shaped area is established according to the maximum operating space in front of the industrial robot;

midpoints of every two opposite sides of the cube-shaped area are connected to divide the cube-shaped area into eight cube-shaped sub-areas, and the eight cube-shaped sub-areas are summarized as six operating areas: a front operating area, a rear operating area, a left operating area, a right operating area, an upper operating area, and a lower operating area;

the set of operating areas is formed by the six operating areas, namely the front operating area, the rear operating area, the left operating area, the right operating area, the upper operating area, and the lower operating area.

The maximum operating space in front of the industrial robot refers to a maximum operating space that can be reached by the mechanical arm of the industrial robot facing forward.

Figure 2:
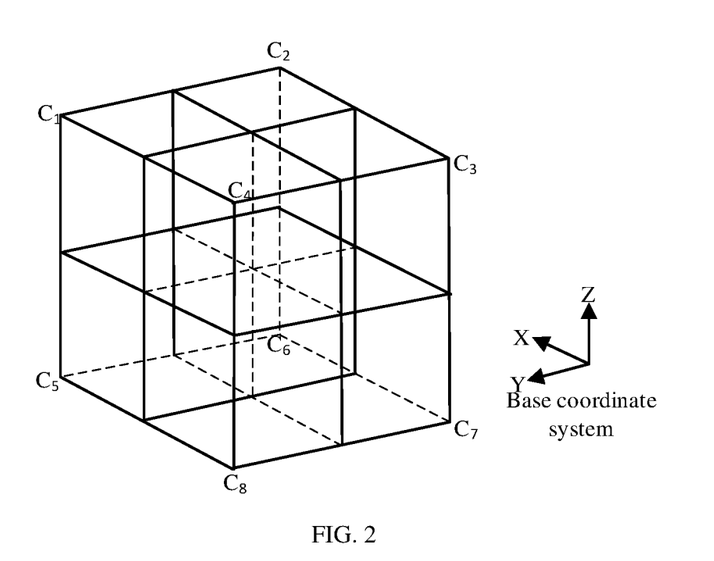
FIG. 2 is a schematic diagram illustrating a division result of a maximum workspace according to an embodiment of the present disclosure.
Figure 3:
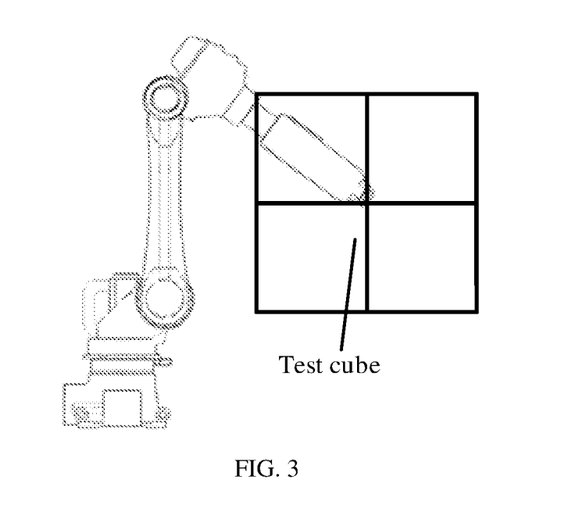
FIG. 3 is a schematic diagram illustrating a division process of a maximum workspace according to an embodiment of the present disclosure.

Specifically, the division result may be shown in FIG. 2, and the division process may be shown in FIG. 3.

With reference to the content of the above embodiment, in an embodiment, the current operating condition includes a current load and a current operating area; accordingly, the step of performing the interpolation on the motion parameter corresponding to the current operating condition, and the interpolation result serving as the motion parameter corresponding to the current operating conditions, includes:

motion parameters corresponding to the reference operating conditions that satisfy a preset condition are averaged, and the average value serves as the motion parameter corresponding to the current operating condition; the preset condition includes: the operating area is the same as a current motion area, and the load is approximate to the current load.

For example, in the current operating condition, the current load is 45 kg, the current operating area is the area A, and there is no reference operating condition with a load of 45 kg in the motion parameter database, but there is a reference operating condition with an operating area of the area A; and there are two reference operating conditions in the motion parameter database with operating areas which are the same as the current motion areas and loads which are approximate to the current loads respectively, namely: the load is 40 kg and the operating area is the area A, the load is 50 kg and the operating area is the area A. Accordingly, a motion parameter corresponding to the reference operating condition with the load of 40 kg and the operating area of the area A and a motion parameter corresponding to the reference operating condition with the load of 50 kg and the operating area of the area A are averaged, and an average value serves as the motion parameter corresponding to the current operating condition.

In the method provided by the embodiment of the present disclosure, the motion parameters corresponding to the reference operating conditions satisfying the preset condition are averaged, and the average value serves as the motion parameter corresponding to the current operating condition. Since there is no reference operating condition matched with the current operating condition in the motion parameter database, the motion parameter of the industrial robot do not need to be calibrated according to the current operating condition, but the motion parameter corresponding to the current operating condition is determined by the interpolation mode, thereby improving the operating efficiency of industrial robot. In addition, it is simpler and more convenient to determine the motion parameter corresponding to the current operating condition. Furthermore, it is ensured that the motion parameters of the industrial robot corresponding to any operating conditions can be determined, thereby improving the motion accuracy of the industrial robot.

With reference to the content of the above embodiment, in an embodiment, the total set of operating conditions includes a set of load values, a set of temperature values, and a set of operating areas; and correspondingly, the step of establishing the motion parameter database includes: each load value in the set of load values, each temperature value in the set of temperature values, and each operating area in the set of operating areas are combined; each combination result serves as a reference operating condition; and a motion parameter corresponding to each reference operating condition is determined; each operating condition and the motion parameter corresponding to each reference operating condition form the motion parameter database.

For the process of determining the set of load values and the set of operating areas, reference may be made to the above-mentioned embodiment of determination of the motion parameter database by the set of load values and the set of operating areas, which will not be repeated here. The value range of the set of temperature values can be determined through the range of the operating temperatures of the industrial robot, and the specific values in the set of temperature values can be determined based on the actual use requirements of the industrial robot, which is not specifically limited by the embodiment of the present disclosure.

Figure 4:
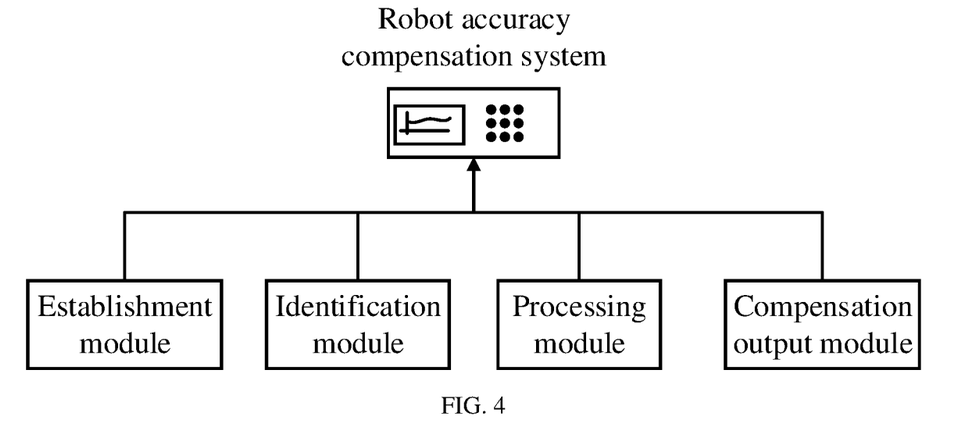
FIG. 4 is a structure block diagram illustrating an industrial robot motion accuracy compensation system according to an embodiment of the present disclosure.

With reference to the content of the above embodiment, in an embodiment, as shown in FIG. 4, an industrial robot motion accuracy compensation system is provided, which includes:

an establishment module configured to establish a motion parameter database, in which the motion parameter database includes a plurality of different reference operating conditions and a motion parameter of the industrial robot corresponding to each reference operating condition, and each reference operating condition is formed by combining each element in each set in a total set of the operation conditions;

an identification module configured to acquire a current operating condition of the industrial robot;

a processing module configured to: determine whether there is a reference operating condition matched with the current operating condition in the motion parameter database, in which the motion parameter database includes a plurality of different reference operating conditions and a motion parameter of the industrial robot corresponding to each reference operating condition; when there is a reference operating condition matched with the current operating condition in the motion parameter database, take a motion parameter corresponding to the matched reference operating condition as a motion parameter corresponding to the current operating condition; when there is no reference operating condition matched with the current operating condition in the motion parameter database, perform an interpolation on a motion parameter corresponding to the current operating condition, and take an interpolation result as the motion parameter corresponding to the current operating condition, and input the motion parameter corresponding to the current operating condition to a compensation output module;

a compensation output module configured to receive the motion parameter corresponding to the current operating condition, and input the motion parameter corresponding to the current operating condition to a robot controller.

It should be noted that in FIG. 4, the robot controller is connected to the establishment module, the identification module, the processing module and the compensation output module respectively.

Figure 5:
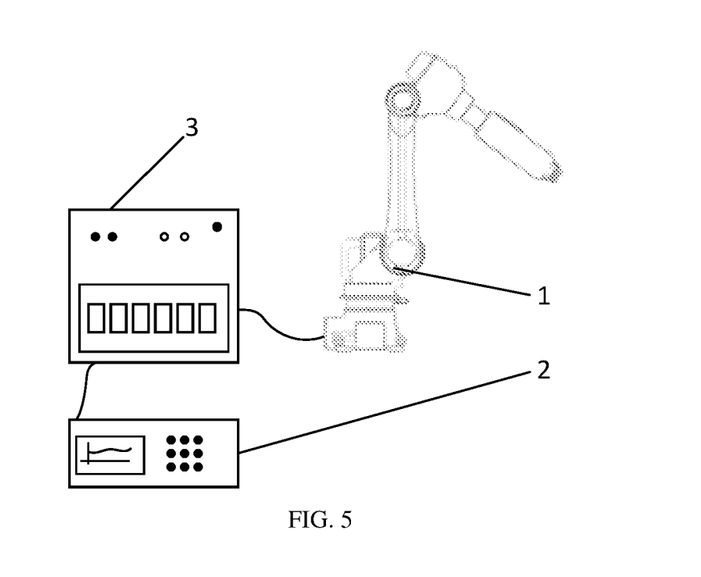
FIG. 5 is an interaction diagram among an industrial robot motion accuracy compensation system, a robot controller and an industrial robot according to an embodiment of the present disclosure.

For the execution process of each module in the above-mentioned system and the explanation of related terms, reference can be made to the contents of the above-mentioned relevant embodiments of the industrial robot motion accuracy compensation method, which will not be repeated here. It should be noted that the diagram illustrating the interaction among the industrial robot motion accuracy compensation system, the robot controller and the industrial robot can be shown in FIG. 5. It should be noted that a reference sign 1 in FIG. 5 denotes a robot body, a reference sign 2 denotes a robot controller, and a reference sign 3 denotes an industrial robot motion accuracy compensation system.

In the system provided by the embodiment of the present disclosure, the motion parameter database is established, the current operating condition of the industrial robot is acquired, and it is determined whether there is a reference operating condition matched with the current operating condition in the motion parameter database; when there is a reference operating condition matched with the current operating condition in the motion parameter database, the motion parameter corresponding to the matched reference operating condition serves as the motion parameter corresponding to the current operating condition; when there is no reference operating condition matched with the current operating condition in the motion parameter database, the interpolation is performed on the motion parameter corresponding to the current operating condition, and the interpolation result serves as the motion parameter corresponding to the current operating condition. Before each operation of the industrial robot, the motion parameter of the industrial robot corresponding to the current operating condition is determined, thereby avoiding the problem that when the operating condition of the industrial robot is changed, the motion parameter of the industrial robot changes, which directly affects the motion accuracy of the industrial robot.

In addition, before each operation of the industrial robot, the motion parameter corresponding to the current operating condition can be determined only by matching the current operating condition with the motion parameter database, without requiring a lot of testing time, thereby improving the operating efficiency of the industrial robot.

In addition, because the motion parameter is not calibrated based on the entire operating area of the industrial robot, but the minimum operating area of the industrial robot is determined before each operation, and then the current operating condition of the industrial robot is matched with the motion parameter database to determine the motion parameter corresponding to the current operating condition. Accordingly, the determined motion parameter is calibrated based on the minimum operating area of the industrial robot during the calibration, so that the determined motion parameter is more accurate, and the motion accuracy is also higher when the industrial robot operates under the motion parameter.

Furthermore, if there is no reference operating condition matched with the current operating condition in the motion parameter database, the interpolation is performed on the motion parameter corresponding to the current operating condition, and the interpolation result serves as the motion parameter corresponding to the current operating condition. Since the motion parameter database excludes the motion parameters of the industrial robot corresponding to any operating conditions, thereby reducing the time and workload for establishing the motion parameter database.

With reference to the content of the above embodiment, in an embodiment, the identification module is configured to acquire the current operating condition of the industrial robot through a manual input mode or an automatic identification mode.

For example, the current operating condition includes a current load and a current operating area; the step of acquiring the current operating condition of the industrial robot by the automatic identification mode includes, but is not limited to: the current load of the industrial robot is identified through a signal such as a torque current of the robot, and the current operating area of the industrial robot is identified through a motion program of the robot.

It should be appreciated that although the various steps in the flow chart of FIG. 1 are shown in sequence according to the arrows, these steps are not definitely executed in the sequence shown by the arrows. Unless explicitly stated herein, the execution of these steps is not strictly limited to the order, and these steps may be performed in other orders. Moreover, at least a part of the steps in FIG. 1 may include multiple steps or multiple stages, these steps or stages are not definitely executed at the same time, but may be executed at different time; and these steps or stages are not definitely performed in sequence, but may be performed in turns or alternately with other steps or at least part of the steps or stages within the other steps.

Figure 6:
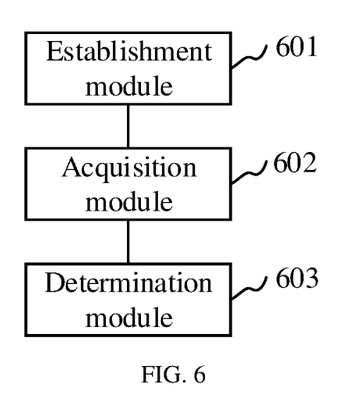
FIG. 6 is a structure block diagram of an industrial robot motion accuracy compensation apparatus according to an embodiment of the present disclosure.

With reference to the content of the above-mentioned embodiment, in an embodiment, as shown in FIG. 6, an industrial robot motion accuracy compensation apparatus is provided, including: an establishment module 601, an acquisition module 602 and a determination module 603.

The establishment module 601 is configured to establish a motion parameter database, in which the motion parameter database includes a plurality of different reference operating conditions and a motion parameter of the industrial robot corresponding to each reference operating condition, and each reference operating condition is formed by combining each element in each set in a total set of the operation conditions.

The acquisition module 602 is configured to acquire the current operating condition of the industrial robot.

The determination module 603 is configured to: determine whether there is a reference operating condition matched with the current operating condition in the motion parameter database; when there is a reference operating condition matched with the current operating condition in the motion parameter database, take a motion parameter corresponding to the matched reference operating condition as a motion parameter corresponding to the current operating condition; when there is no reference operating condition matched with the current operating condition in the motion parameter database, perform an interpolation on a motion parameter corresponding to the current operating condition, and take an interpolation result as the motion parameter corresponding to the current operating condition.

In an embodiment, the establishment module 601 includes:

a first formation unit configured to combine each load value in the set of load values with each operating area in the set of operating areas, take each combination result as a reference operating condition, determine a motion parameter corresponding to each reference operating condition, and form the motion parameter database by each reference operating condition and the motion parameter corresponding to each reference operating condition.

In an embodiment, the first formation unit includes:

an adjustment subunit configured to adjust a load of the industrial robot based on a preset mode, in which an adjustment range of the load is a load range of the industrial robot;

a first formation subunit configured to form the set of load values with a load after each adjustment.

In an embodiment, the first formation unit includes:

a determination subunit configured to determine a maximum operating space in front of the industrial robot;

an establishment subunit configured to establish a cube-shaped area according to the maximum operating space in front of the industrial robot;

a division subunit configured to connect midpoints of every two opposite sides of the cube-shaped area to divide the cube-shaped area into eight cube-shaped sub-areas, and summarize the eight cube-shaped sub-areas as six operating areas, namely a front operating area, a rear operating area, a left operating area, a right operating area, an upper operating area, and a lower operating area;

a second formation subunit configured to form the set of operating areas with the six operating areas, namely the front operating area, the rear operating area, the left operating area, the right operating area, the upper operating area, and the lower operating area.

In an embodiment, the determination module 603 includes:

an averaging unit configured to: average motion parameters corresponding to the reference operating conditions that satisfy a preset condition, take an average value as the motion parameter corresponding to the current operating condition, in which the preset condition includes: an operating area is the same as a current motion area, and a load is approximate to the current load.

In an embodiment, the establishment module 601 includes:

a second formation unit configured to: combine each load value in the set of load values, each temperature value in the set of temperature values, and each operating area in the set of operating areas, take each combination result as the reference operating condition, determine the motion parameter corresponding to each reference operating condition, and form a motion parameter database by each reference operating condition and the motion parameter corresponding to each reference operating condition.

For the specific limitation of the industrial robot motion accuracy compensation apparatus, reference can be made to the limitation on the industrial robot motion accuracy compensation method mentioned above, which will not be repeated here. Each module in the above-mentioned industrial robot motion accuracy compensation apparatus can be implemented in whole or in part by software, hardware and a combination thereof. The above modules can be embedded in or independent of the processor in the computer device in the form of hardware, or stored in the memory in the computer device in the form of software, so that the processor can call and execute the operations corresponding to the above modules.

Figure 7:
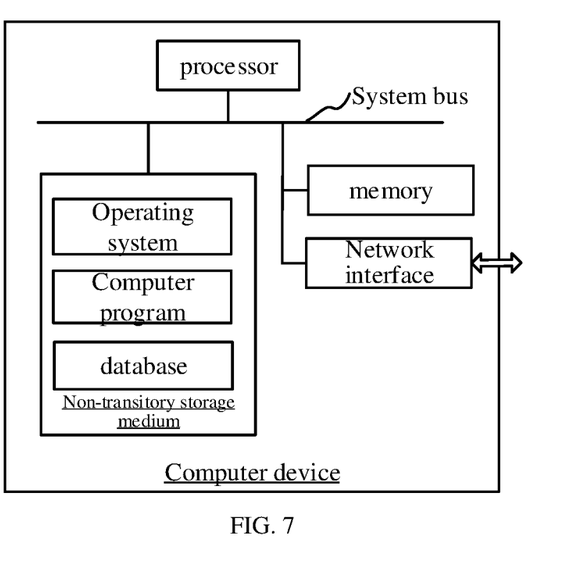
FIG. 7 is an internal structure diagram of a computer device according to an embodiment of the present disclosure.

In an embodiment, a computer device is provided, which can be a server, and an internal structure diagram thereof is shown in FIG. 7. The computer device includes a processor, a memory, and a network interface connected by a system bus. The processor of the computer device is configured to provide computing and control capabilities. The memory of the computer device includes a non-transitory storage medium, an internal memory. The non-transitory storage medium stores an operating system, a computer program, and a database. The internal memory provides an environment for the execution of the operating system and computer program in the non-transitory storage medium. The database of the computer device is configured to store data of the motion parameter database. The network interface of the computer device is configured to communicate with an external terminal through a network connection. When the computer program is executed by the processor, an industrial robot motion accuracy compensation method is implemented.

Those skilled in the art can understand that the structure shown in FIG. 7 is only a block diagram of a partial structure related to the solution of the present disclosure, and does not constitute a limitation on the computer device to which the solution of the present disclosure is applied. A specific computer device may include more or fewer components than shown in the figures, or combine certain components, or have a different arrangement of components.

In an embodiment, a computer device is provided, including a processor and a memory storing a computer program, and the processor, when executing the computer program, implements the following steps of:

establishing a motion parameter database, in which the motion parameter database includes a plurality of different reference operating conditions and a motion parameter of the industrial robot corresponding to each reference operating condition, and each reference operating condition is formed by combining each element in each set in a total set of the operation conditions;

acquiring a current operating condition of the industrial robot;

determining whether there is a reference operating condition matched with the current operating condition in the motion parameter database;

when there is a reference operating condition matched with the current operating condition in the motion parameter database, taking a motion parameter corresponding to the matched reference operating condition as a motion parameter corresponding to the current operating condition;

when there is no reference operating condition matched with the current operating condition in the motion parameter database, performing an interpolation on a motion parameter corresponding to the current operating condition, and taking an interpolation result as the motion parameter corresponding to the current operating condition.

In an embodiment, the total set of operating conditions includes a set of load values and a set of operating areas. Accordingly, the processor further executes the computer program to implements the following steps of:

combining each load value in the set of load values with each operating area in the set of operating areas, taking each combination result as a reference operating condition, determining a motion parameter corresponding to each reference operating condition, and forming the motion parameter database by each reference operating condition and the motion parameter corresponding to each reference operating condition.

In an embodiment, the processor, when executing the computer program, further implements the following step of: adjusting a load of the industrial robot based on a preset mode, in which an adjustment range of the load is a load range of the industrial robot; and forming the set of load values by a load after each adjustment.

In an embodiment, the processor, when executing the computer program, further implements the following steps of:

determining a maximum operating space in front of the industrial robot;

establishing a cube-shaped area according to the maximum operating space in front of the industrial robot;

connecting midpoints of every two opposite sides of the cube-shaped area to divide the cube-shaped area into eight cube-shaped sub-areas, and summarizing the eight cube-shaped sub-areas as six operating areas, namely a front operating area, a rear operating area, a left operating area, a right operating area, an upper operating area, and a lower operating area;

forming the set of operating areas with the six operating areas, namely the front operating area, the rear operating area, the left operating area, the right operating area, the upper operating area, and the lower operating area.

In an embodiment, the current operating condition includes a current load and a current operating area; accordingly, the processor, when executing the computer program, further implements the following steps of: averaging motion parameters corresponding to reference operating conditions that satisfy a preset condition, taking an average value as the motion parameter corresponding to the current operating condition, in which the preset condition includes: an operating area is the same as a current motion area, and a load is approximate to the current load.

In an embodiment, the total set of operating conditions includes a set of load values, a set of temperature values, and a set of operating areas. Accordingly, the processor, when executing the computer program, further implements the following steps of:

combining each load value in the set of load values, each temperature value in the set of temperature values and each operating area in the set of operating areas, taking each combination result as a reference operating condition, determining the motion parameter corresponding to each reference operating condition, and forming the motion parameter database by each reference operating condition and the motion parameter corresponding to each reference operating condition.

In an embodiment, a computer-readable storage medium is provided on which a computer program is stored, and a processor, when executing the computer program, implements the following steps of:

establishing a motion parameter database, in which the motion parameter database includes a plurality of different reference operating conditions and a motion parameter of the industrial robot corresponding to each reference operating condition, and each reference operating condition is formed by combining each element in each set in a total set of the operation conditions;

acquiring a current operating condition of the industrial robot;

determining whether there is a reference operating condition matched with the current operating condition in the motion parameter database;

when there is a reference operating condition matched with the current operating condition in the motion parameter database, taking a motion parameter corresponding to the matched reference operating condition as a motion parameter corresponding to the current operating condition;

when there is no reference operating condition matched with the current operating condition in the motion parameter database, performing an interpolation on a motion parameter corresponding to the current operating condition, and taking an interpolation result as the motion parameter corresponding to the current operating condition.

In an embodiment, the total set of operating conditions includes a set of load values and a set of operating areas. Accordingly, the processor further executes the computer program to implements the following steps of: combining each load value in the set of load values with each operating area in the set of operating areas, taking each combination result as a reference operating condition, determining a motion parameter corresponding to each reference operating condition, and forming the motion parameter database by each reference operating condition and the motion parameter corresponding to each reference operating condition.

In an embodiment, the processor, when executing the computer program, further implements the following step of:

adjusting a load of the industrial robot based on a preset mode, in which an adjustment range of the load is a load range of the industrial robot; and forming the set of load values with a load after each adjustment.

In an embodiment, the processor, when executing the computer program, further implements the following steps of:

determining a maximum operating space in front of the industrial robot;

establishing a cube-shaped area according to the maximum operating space in front of the industrial robot;

connecting midpoints of every two opposite sides of the cube-shaped area to divide the cube-shaped area into eight cube-shaped sub-areas, and summarizing the eight cube-shaped sub-areas as six operating areas, namely a front operating area, a rear operating area, a left operating area, a right operating area, an upper operating area, and a lower operating area;

forming the set of operating areas with the six operating areas, namely the front operating area, the rear operating area, the left operating area, the right operating area, the upper operating area, and the lower operating area.

In an embodiment, the current operating condition includes a current load and a current operating area; accordingly, the processor, when executing the computer program, further implements the following steps of: averaging motion parameters corresponding to reference operating conditions that satisfy a preset condition, taking an average value as the motion parameter corresponding to the current operating condition, in which the preset condition includes: an operating area is the same as a current motion area, and a load is approximate to the current load.

In an embodiment, the total set of operating conditions includes a set of load values, a set of temperature values, and a set of operating areas. Accordingly, the processor, when executing the computer program, further implements the following steps of:

combining each load value in the set of load values, each temperature value in the set of temperature values and each operating area in the set of operating areas, taking each combination result as a reference operating condition, determining the motion parameter corresponding to each reference operating condition, and forming the motion parameter database by each reference operating condition and the motion parameter corresponding to each reference operating condition.

A person of ordinary skill in the art can understand that all or part of the processes in the methods in the above-mentioned embodiments can be completed by instructing relevant a hardware through computer-readable instructions.

The computer-readable instructions can be stored in a non-transitory computer-readable storage medium, the computer-readable instructions, when executed, can include the processes of the above-mentioned method embodiments. Any reference to the memory, storage, database or other media used in the embodiments provided by the present disclosure may include a non-transitory and/or a transitory memory. The non-transitory memory may include a read only memory (ROM), a magnetic tape, a floppy disk, a flash memory or an optical memory, etc. The transitory memory may include a random access memory (RAM) or an external cache memory. As an illustration and not a limitation, RAM is available in many forms, such as a static RAM (SRAM), a dynamic RAM (DRAM), etc.

The technical features of the above embodiments can be combined arbitrarily. In order to make the description concise, all possible combinations of the technical features in the above embodiments are not described. However, as long as there is no contradiction in the combinations of these technical features, these combinations should be considered as the scope of the present disclosure.

The above-mentioned embodiments are merely some embodiments of the present disclosure, and the description thereof is relatively specific and detailed, but they should not be understood as a limitation on the scope of the present disclosure. It should be pointed out that those of ordinary skill in the art can make several variations and improvements without departing from the concept of the present disclosure, and these all fall within the protection scope of the present disclosure. Therefore, the scope of protection of the present disclosure shall be subject to the appended claims.

What is claimed is:

1. An industrial robot motion accuracy compensation method, comprising:
   establishing a motion parameter database, wherein the motion parameter database includes a plurality of different reference operating conditions and a motion parameter of the industrial robot corresponding to each reference operating condition, and each reference operating condition is formed by combining each element in each set in a total set of operation conditions;
   acquiring a current operating condition of the industrial robot;
   determining whether there is a reference operating condition matched with the current operating condition in the motion parameter database;
   when there is a reference operating condition matched with the current operating condition in the motion parameter database, taking a motion parameter corresponding to the matched reference operating condition as a motion parameter corresponding to the current operating condition;
   when there is no reference operating condition matched with the current operating condition in the motion parameter database, performing an interpolation on a motion parameter corresponding to the current operating condition, and taking an interpolation result as the motion parameter corresponding to the current operating condition;
   wherein the total set of operating conditions comprises a set of load values and a set of operating areas, and accordingly the establishing the motion parameter database comprises:
   combining each load value in the set of load values with each operating area in the set of operating areas, taking each combination result as a reference operating condition, determining a motion parameter corresponding to each reference operating condition, and forming the motion parameter database by each reference operating condition and the motion parameter corresponding to each reference operating condition.

2. The method according to claim 1, wherein a determination of the set of load values comprises:
   adjusting a load of the industrial robot based on a preset mode, wherein an adjustment range of the load is a load range of the industrial robot; and
   forming the set of load values by a load after each adjustment.

3. The method according to claim 1, wherein a determination of the set of operating areas comprises:
   determining a maximum operating space in front of the industrial robot;
   establishing a cube-shaped area according to the maximum operating space in front of the industrial robot;
   connecting midpoints of every two opposite sides of the cube-shaped area to divide the cube-shaped area into eight cube-shaped sub-areas, and forming the set of operating areas by the eight cube-shaped sub-areas.

4. The method according to claim 1, wherein the current operating condition comprises a current load and a current operating area; accordingly, the performing the interpolation on the motion parameter corresponding to the current operating condition and taking the interpolation result as the motion parameter corresponding to the current operating condition comprises:
   averaging motion parameters corresponding to reference operating conditions that satisfy a preset condition, taking an average value as the motion parameter corresponding to the current operating condition, wherein the preset condition comprises: an operating area is the same as a current motion area, and a load is approximate to the current load.

5. The method according to claim 1, wherein the total set of operating conditions comprises a set of load values, a set of temperature values, and a set of operating areas; accordingly, the establishing the motion parameter database comprises:
   combining each load value in the set of load values, each temperature value in the set of temperature values and each operating area in the set of operating areas, taking each combination result as a reference operating condition, determining the motion parameter corresponding to each reference operating condition, and forming the motion parameter database by each reference operating condition and the motion parameter corresponding to each reference operating condition.

6. A computer device, comprising a processor and a memory storing a computer program, wherein the processor, when executing the computer program, implements the steps in the method of any one of claims 1 to 5.

7. A computer-readable storage medium, on which a computer program is stored, wherein when the computer program is executed by a processor, the steps in the method of any one of claims 1 to 5 are implemented.

8. An industrial robot motion accuracy compensation system, comprising:
   an establishment module configured to establish a motion parameter database, wherein the motion parameter database comprises a plurality of different reference operating conditions and a motion parameter of the industrial robot corresponding to each reference operating condition, and each reference operating condition is formed by combining each element in each set in a total set of the operation conditions, the total set of operating conditions comprises a set of load values and a set of operating areas, and accordingly the establishing the motion parameter database comprises:

combining each load value in the set of load values with each operating area in the set of operating areas, taking each combination result as a reference operating condition, determining a motion parameter corresponding to each reference operating condition, and forming the motion parameter database by each reference operating condition and the motion parameter corresponding to each reference operating condition;

an identification module configured to acquire a current operating condition of the industrial robot;

a processing module configured to: determine whether there is a reference operating condition matched with the current operating condition in the motion parameter database, [[wherein the motion parameter database comprises a plurality of different reference operating conditions and a motion parameter of the industrial robot corresponding to each reference operating condition]]; when there is a reference operating condition matched with the current operating condition in the motion parameter database, take a motion parameter corresponding to the matched reference operating condition as a motion parameter corresponding to the current operating condition; when there is no reference operating condition matched with the current operating condition in the motion parameter database, perform an interpolation on a motion parameter corresponding to the current operating condition, and take an interpolation result as a motion parameter corresponding to the current operating condition, and input the motion parameter corresponding to the current operating condition to a compensation output module;

the compensation output module configured to receive the motion parameter corresponding to the current operating condition, and input the motion parameter corresponding to the current operating condition to a robot controller.

9. The system according to claim 6, wherein the identification module is configured to acquire the current operating condition of the industrial robot through a manual input mode or an automatic identification mode.

\* \* \* \* \*

UNITED STATES PATENT AND TRADEMARK OFFICE
CERTIFICATE OF CORRECTION

| | |
|---|---|
| PATENT NO. | : 11,660,745 B2 |
| APPLICATION NO. | : 17/965079 |
| DATED | : May 30, 2023 |
| INVENTOR(S) | : Chengju Dong et al. |

It is certified that error appears in the above-identified patent and that said Letters Patent is hereby corrected as shown below:

On the Title Page (72) Inventor:
"Boehen Chen, Guangzhou (CN)", should read –Bochen Chen, Guangzhou (CN)–

Please add the following:
--(30) Foreign Application Priority Data
Oct. 18, 2021 (CN) -------------------- 202111211520.3--

Signed and Sealed this
Eleventh Day of June, 2024

Katherine Kelly Vidal
*Director of the United States Patent and Trademark Office*